Feb. 21, 1956  H. J. DANA ET AL  2,736,001
WARNING LIGHT FOR POWER LINES
Filed May 19, 1952  6 Sheets-Sheet 1

INVENTORS
Homer J. Dana
BY Jack D Fogelquist
Russell O. Ohlson
Greek Wells Atty.

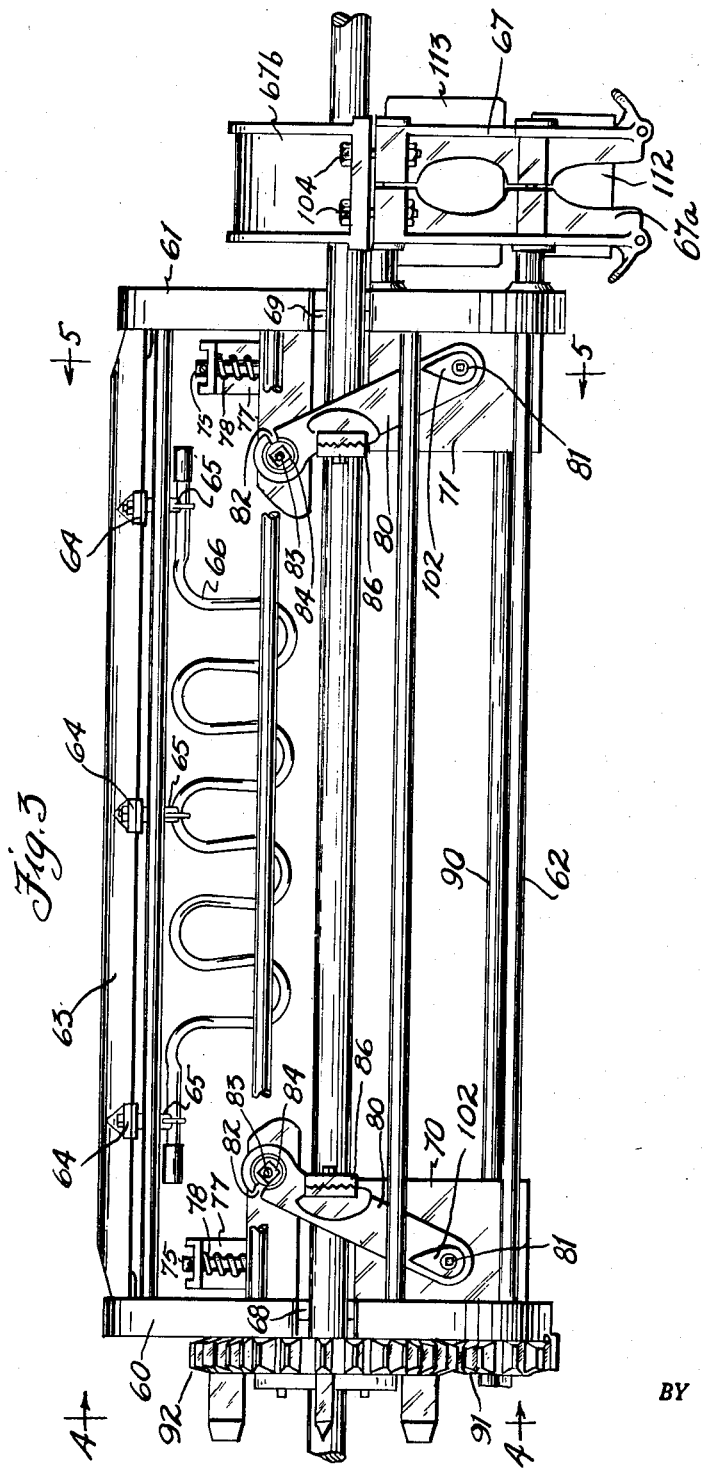

INVENTORS
Homer J. Dana
Jack D. Fogelquist
Russell O. Ohlson
BY
Greek Wells
Atty.

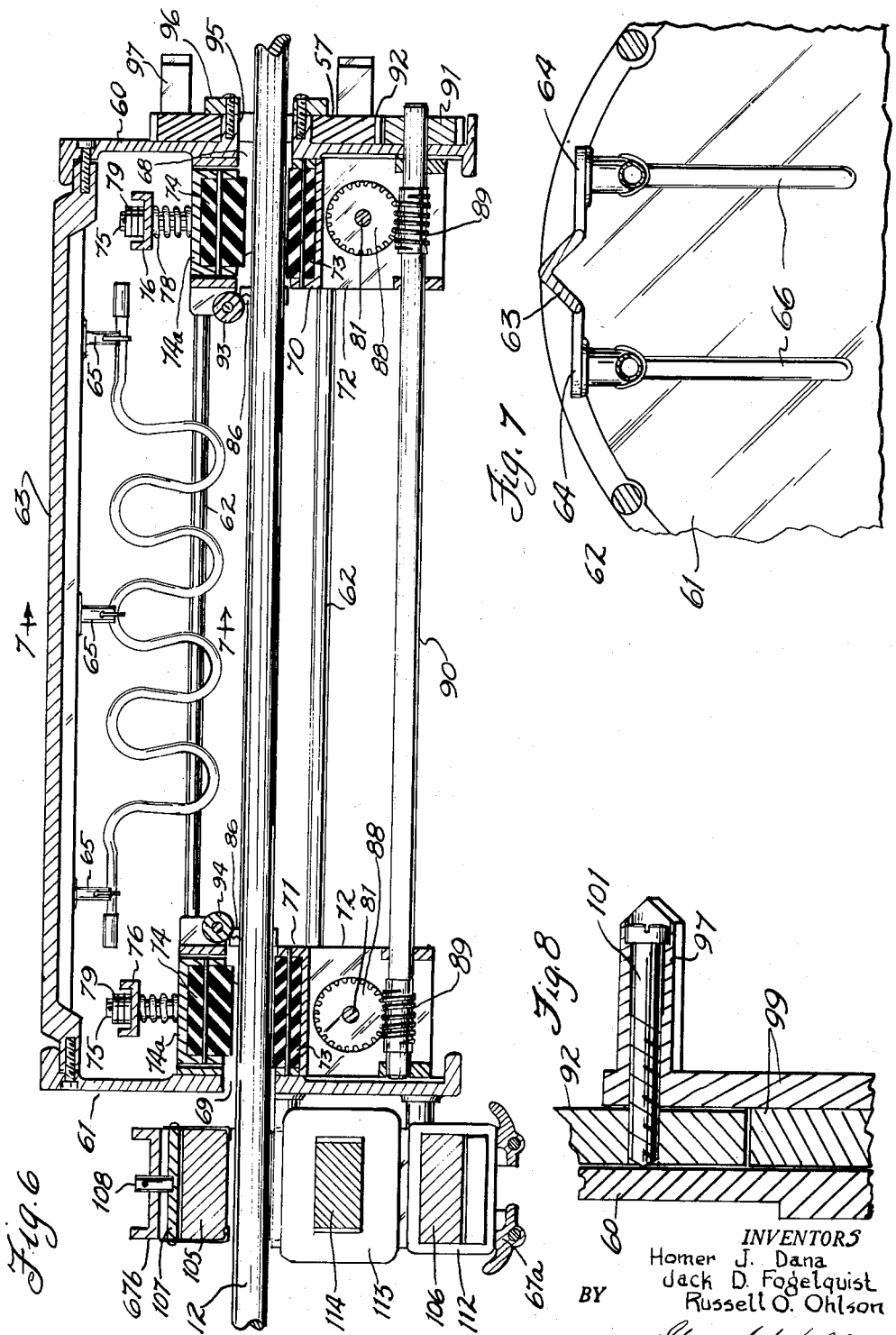

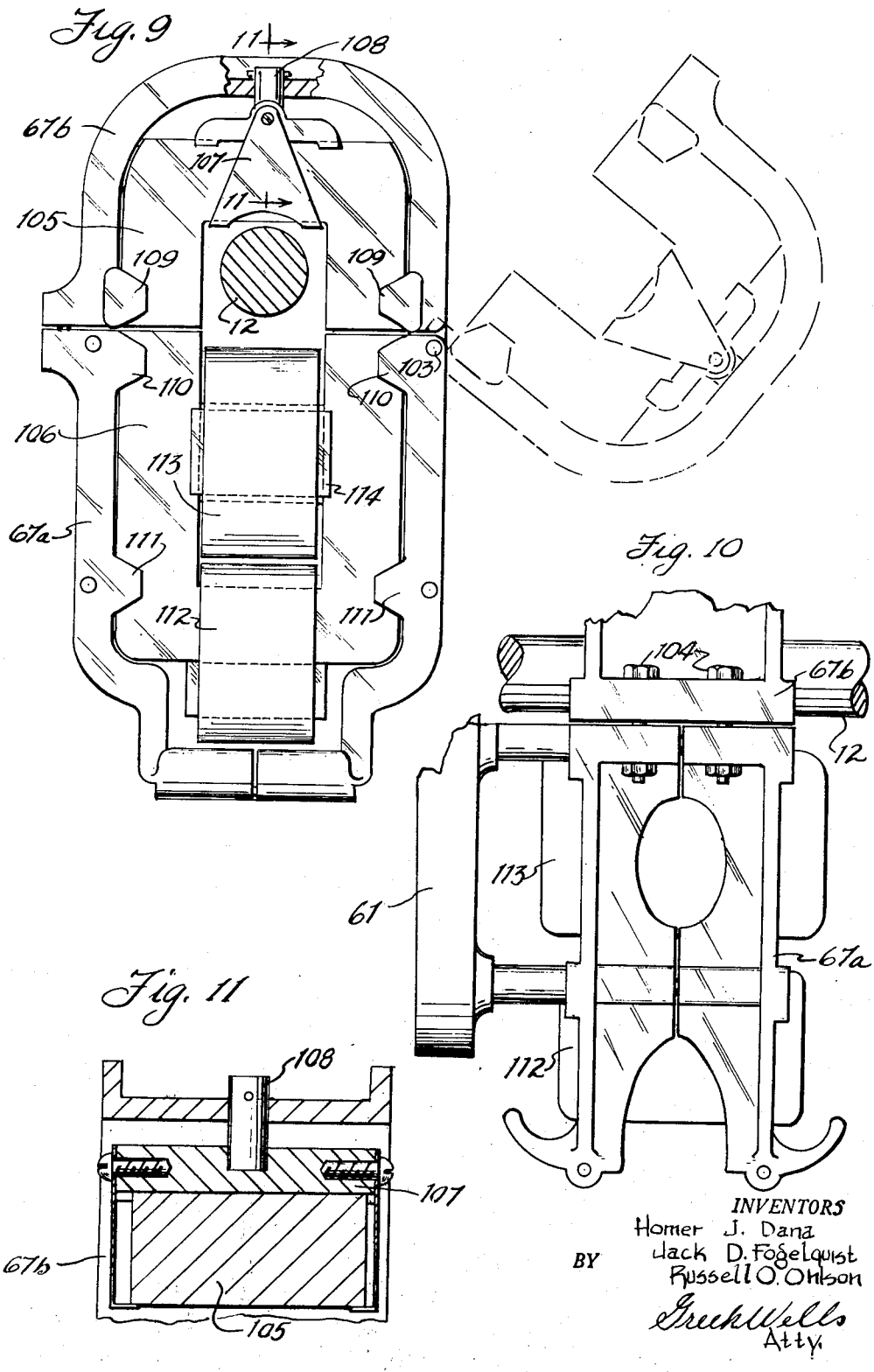

Feb. 21, 1956 H. J. DANA ET AL 2,736,001
WARNING LIGHT FOR POWER LINES
Filed May 19, 1952 6 Sheets-Sheet 6

INVENTORS
Homer J. Dana
Jack D. Fogelquist
BY Russell O. Ohlson

Greek Wells
Atty.

United States Patent Office 2,736,001
Patented Feb. 21, 1956

2,736,001

WARNING LIGHT FOR POWER LINES

Homer J. Dana, Pullman, Jack D. Fogelquist, Richland, and Russell O. Ohlson, Rockford, Wash., assignors, by mesne assignments, to Research Corporation, New York, N. Y., a corporation of New York Application May 19, 1952, Serial No. 288,726

6 Claims. (Cl. 340—28)

The present invention relates to improvements in a warning light for power lines.

Power lines today are an ever present hazard to low altitude flying. This is especially true where the power lines span those level valleys which by their location and character serve as clearly defined guide routes for aircraft pilots crowded down by low ceilings. For many years it has been common practice to provide obstruction lights at the power line towers at each end of a river crossing span. These lights however, do not locate the conductor position and the towers in many cases are so far apart that the lights thereon do not adequately protect the aviator.

It is the purpose of this invention to provide a warning light and a system for attaching it to the conductor by which the conductor will be identified by a safety light visible for at least several miles, the light being located anywhere along the conductor and at as short a spacing as is necessary to provide an adequate warning to the aviator pilots crossing the path of the power line. The present invention contemplates a light assembly consisting of a cage which is constructed with guides to receive the power line conductor and permit the cage to move along the conductor itself from a support tower to the proper location. This cage carries a warning light of the neon tube type, with a safety reserve light so as to produce a normal life expectancy of several years. The cage carries a transformer which takes power from the conductor to energize the light. The construction is such that the light will be energized over a wide range of current flow in the conductor. The cage carries clamps which may be closed on the conductor after the light arrives at the desired position, to retain the cage in place. Combined with the cage is a carriage which serves to take the cage out to the desired point on the conductor and then operates the clamps to secure the cage to the conductor. The carriage carries power means to attach it to the cage and power means to operate the clamps. It is a self propelled carriage having its own power motor for moving the carriage and the cage along the conductor. The entire device is remote controlled during installation from a ground point where power is supplied for the motors on the carriage through a conductor cable which is suspended from the power line conductor as the carriage moves out from one of the towers at the end of the conductor span.

Another and more particular object of the invention is to provide, in a device of the character described, a novel transformer unit for maintaining the necessary limitations on the amount of the current supplied to the tubes to protect the installation over the wide range of current flow that necessarily takes place in a power line conductor. Power line current flow has a wide variation. For example, the current may drop to as low as fifty amperes and go up to as high as eight hundred or more amperes on a large power line conductor.

The objects and advantages of the invention will appear more fully from the following description and the accompanying drawings illustrating a preferred form of the invention. The drawings and description are illustrative only however, and are not intended to limit the invention except insofar as it is limited by the claims.

In the drawings:

Figure 3 is an enlarged view in side elevation of the warning light cage and the parts carried thereby;

Figure 6 is a sectional view taken on the line 6—6 of Figure 5;

Figure 7 is an enlarged fragmentary sectional view taken substantially on the line 7—7 of Figure 6;

Figure 8 is an enlarged fragmentary sectional view taken substantially on the line 8—8 of Figure 4;

Figure 9 is an end view of the transformer portion of the cage;

Figure 10 is a fragmentary view in side elevation of the transformer mounting;

Figure 11 is a sectional view taken on the line 11—11 of Figure 9 through a transformer core mounting element that is utilized in mounting the transformer to the cage;

Figure 2:
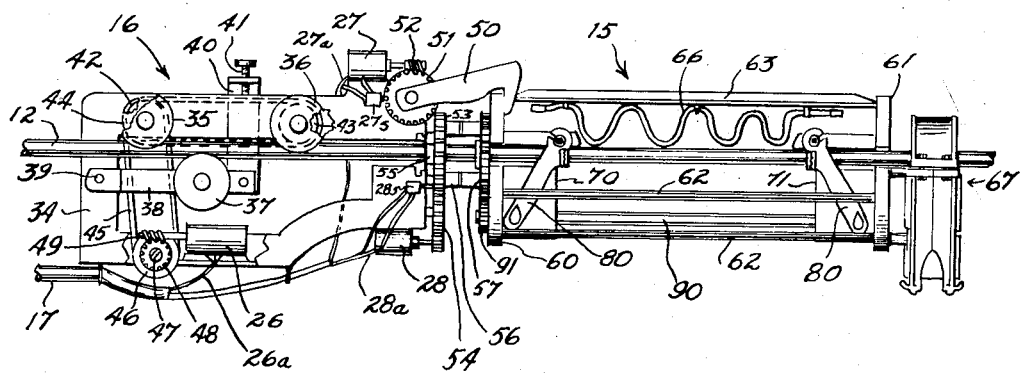
Figure 2 is a close up view in side elevation of the warning light and its installing carriage as they appear when moving along a power line conductor.
Figure 1:
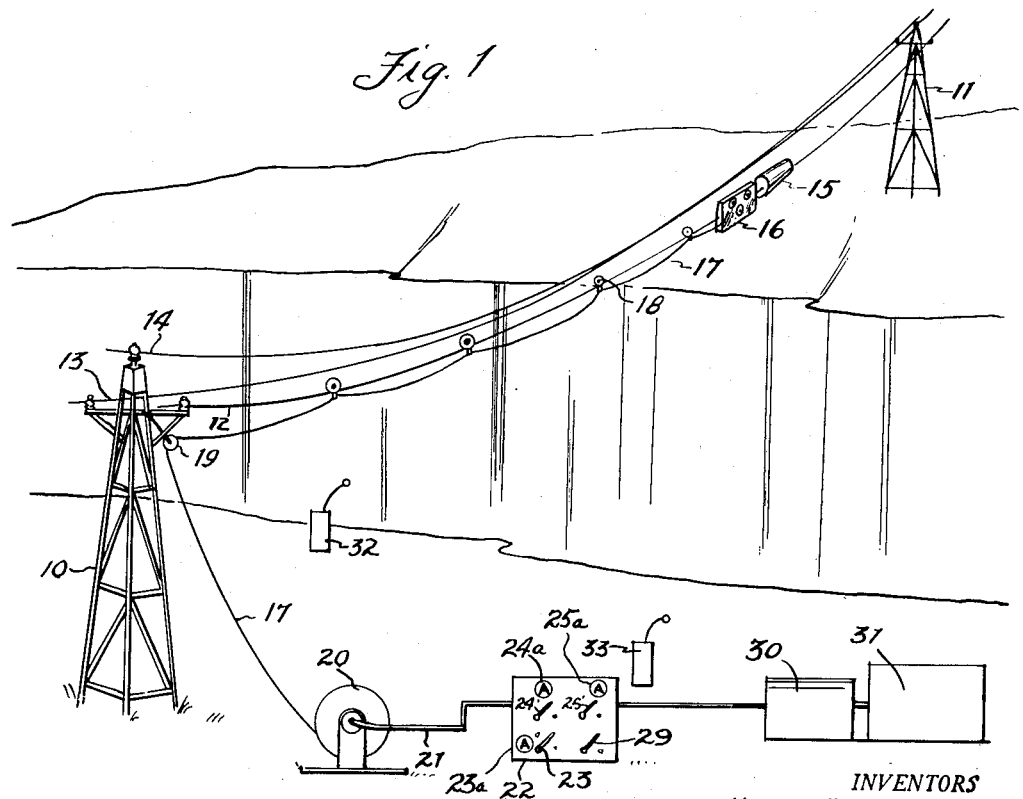
Figure 1 is a somewhat diagrammatic view illustrating the installing of the warning light on a power light crossing span.

Referring now in particular to Figures 1 and 2 of the drawings, the invention is shown in connection with a power line. The numerals 10 and 11 represent supporting towers on the opposite banks of a stream and the numerals 12, 13 and 14 indicate conductors in the usual three wire patterns of a high voltage power transmission system. The warning light cage of the present invention is indicated by the numeral 15, the installing carriage is identified by the numeral 16 and a multiple conductor cable for supplying power to the carriage 16 is indicated by the numeral 17. A plurality of supporting trolleys 18 are provided for suspending the cable 17 from the power line conductor 12. These trolleys 18 are of a quick detachable type which may be placed on the conductor 12. The cable 17 is hooked into a new trolley 18 as the carriage 16 moves out along the conductor 12 so that enough trolleys 18 are provided to keep the cable 17 from sagging unduly. The work of installing is carried on from the vicinity of the supporting tower 10. The cable 17 is led down over a pulley 19 to a supply reel 20. The supply reel 20 contains sufficient length of the cable 17 to take care of the length of the span between the towers 10 and 11. The cable 17 and a supply cable 21 are connected at the center of the reel 20 by suitable rings and contacts to pass current from the conductors of the cable 21 to the conductors of the cable 17. The cable 21 leads to a control panel 22 having individual control switches 23, 24, and 25 for the conductors that supply current to three motors 26, 27 and 28 on the carriage 16. The main control switch 29 is also provided at the panel 22.

Since these installations must often be made in places remote from ordinary current supply, we provide a generator 30 and a prime mover 31 such as an internal combustion engine for supplying power current.

In order to control the operation it is usually necessary to provide an observer beneath the power line crossing. A workman on the tower 10 will originally mount the cage 15 and the carriage 16 on the conductor 12 and will supply the trolleys 18 as the carriage 16 moves the cage 15 out along the power line conductor 12. For communication purposes the observer beneath the power line is provided with a portable radio receiving and transmitting set 32 and the operator at the control panel 22 has a similar sending and receiving set 33.

The carriage 16 comprises a carriage frame 34 which mounts two conductor riding sheaves 35 and 36 in position to engage the power line conductor 12 and suspend the carriage 16 from the conductor. A third sheave 37 is mounted on an arm 38 which is pivoted by a pivot pin 39 to the frame 34. The sheave 37 is positioned horizontally between the sheaves 35 and 36 to press upwardly on the conductor 12. The degree of pressure is controlled by an arm 40 that extends up from the arm 38 and over the top of the frame 34, and an adjustment screw 41 which is threaded through the upper portion of the arm 40 and which engages the top of the frame 38. The sheaves 35 and 36 are drivingly connected together by V-belt pulleys 42 and 43. A third pulley 44 is provided on the shaft of the sheave 35 for a main drive belt 45. The drive belt 45 is trained around a pulley 46 which is fixed to a shaft 47. The shaft 47 is journalled in the frame 34 and carries a worm gear 48 which meshes with a worm 49 on the shaft of the motor 26. One group 26a of conductors from the cable 17 supply power to the motor 26. The motor 26 is a reversible motor so that it may drive the sheaves 35 and 36 in opposite directions to move the carriage out along the conductor 12 from the tower 10 and return it.

The carriage 16 has means to attach it to the cage 15. This means comprises a hook 50 that hooks over one end of the cage 15. The hook 50 is pivoted on the carriage 16 and is connected by gearing 51—52 to the motor 27. The motor 27 is a reversible motor and obtains its power supply over a group of conductors 27a forming part of the cable 17. By driving the motor 27 in one direction, the hook 50 is lowered into engagement with the cage 15 so that the cage and carriage cannot be separated. Upon reversal of the motor 27, the hook 50 is raised above the cage 15 to free the carriage 16 so it may be returned to the tower 10, leaving the cage 15 behind.

The motor 28 furnishes the motive power to lock the carriage 16 to the conductor 12 at the desired location between the towers 10 and 11. The motor 28 is a reversible motor which receives its current over a group 28a of conductors forming part of the cable 17. A driving head 53 is journalled on the front end of the carriage 16 and is connected to the motor 28 by gearing 54. The driving head 53 has a portion 55 that can be opened out so that the conductor 12 will enter. The driving head 53 also has projections 56 to engage corresponding projections on a driven head 57 that is journalled on the cage 15. The head 57 operates a mechanism described later herein to clamp the cage 15 to the conductor 12.

The construction of the cage 15 is best illustrated in Figures 3 to 8 inclusive. The cage consists essentially of two end pieces 60 and 61 connected by a plurality of rods 62. The end pieces 60 and 61 are substantially circular and the rods 62 are spaced about the circumferences of the end pieces. In addition, a light tube mounting bar 63 extends between the end pieces 60 and 61 and is connected to them at their topmost edges. The bar 63 has supports 64 which mount insulating hangers 65 for two gaseous conduction tubes 66.

The end piece 60 carries the operating head 57 and the end piece 61 carries a transformer support 67. Both end pieces 60 and 61 have slots indicated at 68 and 69 which extend in from the side edges to receive the conductor 12. Conductor clamp units 70 and 71 are mounted on the pieces 60 and 61. The two conductor clamp units are essentially alike. Each unit comprises a metal bracket 72 which mounts a stationary clamping block 73 which is constructed of a yielding material that will not injure the conductor 12. The bracket 72 slidably mounts an upper clamp block 74 of the same material so that it can be moved up and down to engage a conductor resting on the lower block 73. The upper clamp block 74 is suspended by a pin 75 from an arm 76 on the upper end of an actuating bar 77. The spring 78 is interposed between the arm 76 and a box 74a which mounts the block 74 so that the spring 78 always yieldably presses the block 74 downwardly as far as it is allowed to go by the pin 75. Washers 79 are utilized to predetermine the amount to which the block 74 will be spaced downwardly from the arm 76. The bracket 72 also carries a latch 80 which is adapted to close the opening in the bracket through which a conductor 12 enters. The latch 80 is pivoted on a shaft 81 which is journalled in the lower portion of the bracket 72. At its upper end the latch 80 is slotted as indicated at 82 to pass over a threaded pin 83 that is provided on the upper portion of the bracket 72. A nut 84 on the pin 83 is used to clamp the latch 80 when it is raised to engage the pin 83 and close the entrance slot for the conductor 12. In order to center a conductor 12 on the clamping blocks 73 and 74, the bracket 72 carries a stop 85 and the latch 80 carries an adjustable stop 86 which can be moved toward or away from the stop 85 to accommodate smaller or larger conductors 12.

The bar 77 is secured to the shaft 81 by an eccentric pin 87 so that by turning the shaft 81, the bar 77 can be raised and lowered to raise and lower the clamping block 74. The shaft 81 has a worm gear 88 thereon which meshes with a worm 89 on a shaft 90. The shaft 90 extends full length of the cage 15, and has a worm 89 thereon for each of the clamping devices in the brackets 70 and 71. The shaft 90 extends through the end piece 60 and has a pinion 91 fixed thereon to mesh with a gear 92 that is part of the driven head 57. When the head 57 is rotated, it drives the pinion 91 and the shaft 90 so as to rotate the gears 88 and shafts 81 for raising and lowering the bars 77 of the two clamping devices. In order to facilitate the travel of the cage 15 along the conductor 12, small rollers 93 and 94 may also be provided on the brackets 70 and 71 to ride on the top of the conductor 12.

Figure 4:
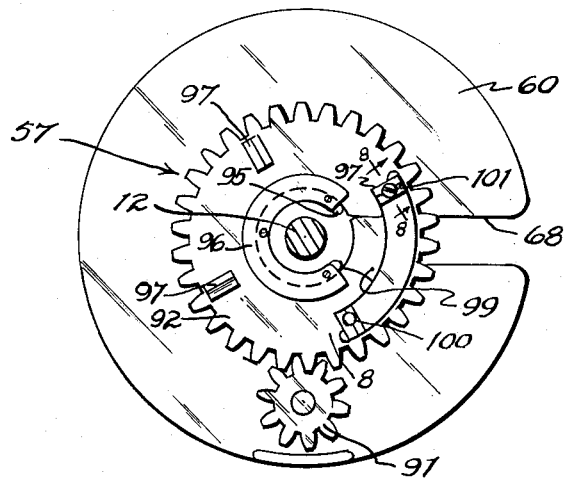
Figure 4 is an end view looking at the left hand end of Figure 3 as indicated by the section line 4—4.
Figure 5:
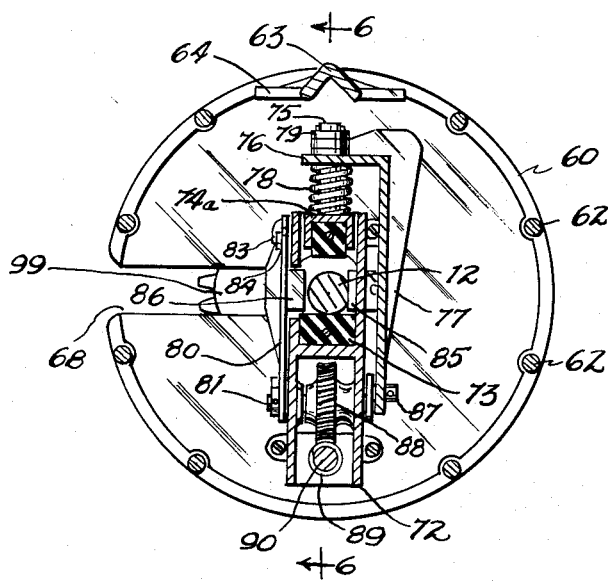
Figure 5 is a sectional view taken on the line 5—5 of Figure 3.

The mounting of the driven member 57 on the end piece 60 and the construction of the member 57 to permit it to receive the conductor 12 are shown best by Figures 4, 6 and 8. The end piece 60 has a flange 95 around the inner end of the slot 68 and the driven member 57 has its gear portion 92 cut out to fit the flange 95. An open ring 96 is secured to the flange 95 and overlaps the gear portion 92 to hold it in place. Lugs 97 are provided on the member 57 for engagement with corresponding lugs 56 on the drive member 53. The member 57 must have a segment that can be opened to permit a conductor 12 to be inserted. This segment is shown at 99 in Figures 4 and 8. It is pivoted by pivot pin 100 to the gear portion 92 and secured in place by a screw 101 that extends down through one of the lugs 97 into the gear portion 92. By removing the screw 101, the portion 99 can be rotated on its pivot 100 to clear the slot 68 for entrance of a conductor 12. After the conductor 12 is seated at the center of the gear portion 92, the segment 99 can be returned to place and secured by the screw 101. It is evident that by rotation of the driven member 57, the pinion 91 can be turned to operate the clamping mechanism carried by the brackets 70 and 71. In order to provide a simple indicating means for enabling a workman to see whether the clamps 74 are raised or lowered, pointers 102 are provided on the shafts 81 and are so arranged that they extend vertically when the bars 77 are in their uppermost position to release the clamps.

Power for operating the gaseous conduction tubes 66 is obtained by a transformer which is mounted in the transformer support 67. The transformer support 67 comprises a lower section 67a and an upper section 67b which is hinged to the lower section by a hinge pin 103 and is secured, after a conductor 12 is inserted, by bolts 104. The transformer has its core split into an upper section 105 and a lower section 106. The upper section 105 of the core is supended in the hinge portion 67b by a bracket member 107 and a supporting pin 108 for the bracket member 107. Guide lugs 109 are also provided on the portion 67b to hold the core portion 105. The lower part 106 of the core is seated in the portion 67a and held against displacement by guide lugs 110 and 111. This transformer is provided with a secondary winding 112 and the conductor 12 provides the primary winding of the transformer. The details of the electrical circuit for the transformer are illustrated best in Figures 12 and 13.

The transformer just described constitutes what is commonly termed a current transformer depending on the current in the conductor 12 for its operation. The secondary winding 112 has enough turns to supply the voltage required to ignite one of the tubes 66 to which it is connected. If a neon tube of 12 mm. size and 4 feet long is used, the required igniting voltage is in the order of 1200 to 1500 volts. The tube current at this voltage will be in the order of 10 to 15 milliamperes R. M. S.

Figure 12:
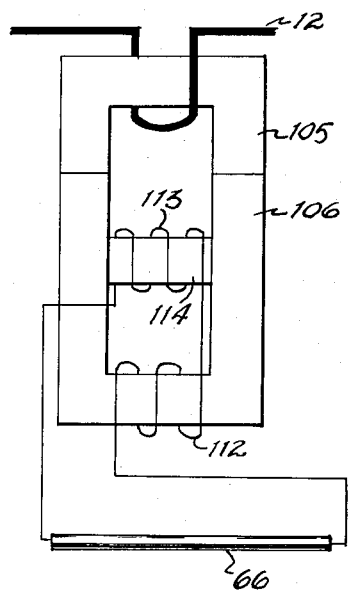
Figure 12 is a diagrammatic view illustrating the electrical connection in the transformer-warning light arrangement.
Figure 13:
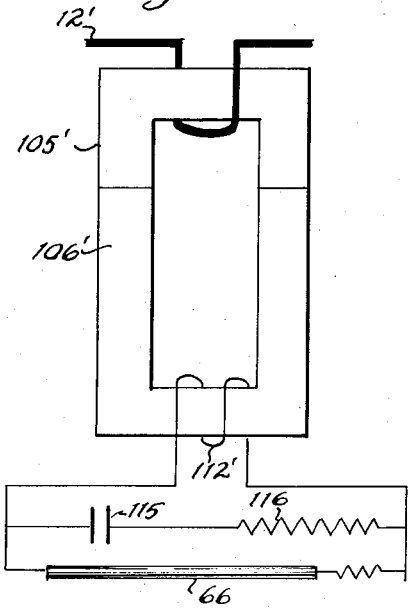
Figure 13 is a view like Figure 12 illustrating a modified arrangement of the electrical connections for the transformer-warning light combination.

The transformer is designed to operate the neon tube 66 when there is certain minimum line current flowing, for example, 50 amperes. It also must not overload the neon tube when the line current rises to its maximum, for example, 800 amperes. There are several transformer circuits which can be employed to limit the tube current during heavy line loads. Two typical examples are shown in Figures 12 and 13. Figures 3, 9 and 10 show the type of transformer illustrated in Figure 12 installed in the transformer support 67.

Figure 14:
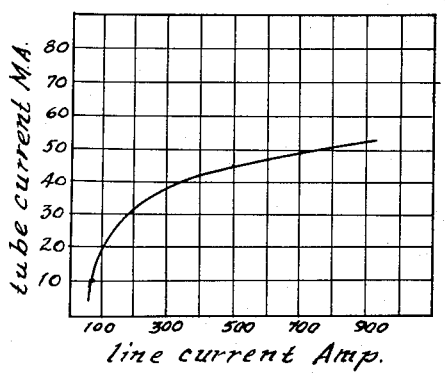
Figures 14 and 15 are graphs illustrating the power line current-tube current relation for various amounts of current flow in the power line with the two transformer arrangements shown in Figures 12 and 13.

Figure 12 shows a current transformer with the core sections 105 and 106 combined with a magnetic shunt 114. The magnetic shunt 114 is used as the core for a choke coil 113. The choke coil 113 is connected in series with the secondary winding 112 in such a way that the higher the current in the secondary winding 112, the greater will be the amount of magnetic flux diverted through the magnetic shunt 114. In other words, the choke coil 113 increases the magnetic shunting effect with increasing line current, and this causes the tube current curve to drop the desired amount, as the primary current increases, to protect the tube against overload. Figure 14 is a graph illustrating the effect of the magnetic shunt on the tube current as the line current increases.

Figure 15:
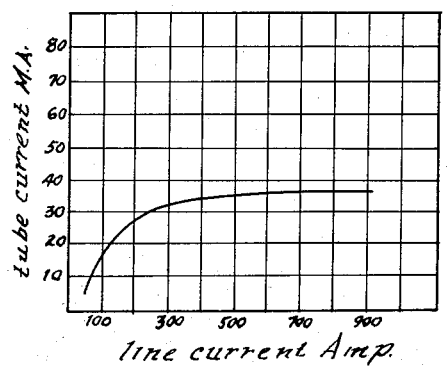

The transformer circuit shown in Figure 13 is another type which accomplishes the same overload protection by the use of a resistor-capacitor shunt across the secondary winding. In this figure the core 105'—106' does not necessarily have a magnetic shunt. The secondary winding 112' has a condenser 115 and a resistance 116 connected in parallel with the neon tube 66. This circuit in operation utilizes the resistance 116 and the condenser 115 as a time circuit. The transformer will first charge the condenser 115, which will then discharge through the neon tube 66. A typical oscillographic current curve for one cycle, where the time required to charge the condenser is about 2,000 microseconds and the time for the condenser in turn to discharge itself through the neon tube is about the same, shows that the neon tube ignited and went out twice during each half of a 60 cycle operation. This particular circuit appears to give very good control of the tube current supply since the tube current levels off as the line current in the conductor 12 increases. The graph shown in Figure 15 is a typical example of the rise in tube current as the line current increases.

The particular transformer circuits shown and described are examples only, and other known means may be used for limiting the current supply to the tubes 66 as the line current in the conductor 12 rises. Owing to the wide fluctuation of current flow in high tension power lines, it is necessary to utilize some current limiting device in connection with the neon tubes 66 to avoid damage to them. Where the weight is an important problem, and it usually is, the transformer circuit shown in Figure 13 offers considerable saving in weight because a light weight condenser 115 and resistance 116 take the place of the heavier choke coil 113 and magnetic shunt 114.

The entire cage unit is preferably constructed to have as little weight as possible. The end pieces 60 and 61, the brackets 70 and 71, and the associated parts are made of light metals. It is possible to obtain a complete unit, including two four-foot neon tubes at an approximate weight of 30 pounds.

The tubes 66 are used in pairs and are connected in parallel across the secondary winding 112 or 112' of the transformer. In operation, only one of these tubes will light up at a time. This is the tube having the lowest igniting voltage. The other tube 66 merely serves as a standby until the first tube fails, or hardens, to the point where the second tube has a lower igniting voltage. The second tube will then automatically light up. This arrangement provides for a much greater life of the assembly than would a single tube and, with normal tube life expectancy of five years or more now available, a particular installation may run for quite a long time without need for any service attention.

When a cage 15 is to be installed the cage and carriage are hung on the conductor 12 at the tower 10. The sheave 37 is drawn up by adjusting the screw 41 to provide the necessary pressure of the driving sheaves 35 and 36 on the conductor 12. The motor 27 is energized by closing the proper switch 24 to cause the hook 50 to engage the carriage 15. The motor turns a predetermined number of revolutions in a direction to lower the hook 50 and at that point a cycle switch 27s in the carriage 16 is engaged to open the hook closing circuit for the motor. When the switch 27s is actuated, the motor will stop and show no current on the ammeter 24a. The operator is thus warned that the hook 50 is closed. He opens the switch 24. Next the operator closes the switch 23 to run the motor 26 in the right direction to move the carriage 16 and the cage 15 out along the conductor 12. As the carriage and cage move out along the conductor 12, the man on the tower adds trolleys 18 to keep the conductor 17 from sagging. When the carriage and cage are moved out far enough, the operator at the control panel opens the switch 23. If the control panel is so positioned that the observer at 32 is needed, this observer notifies the operator at the panel 22 when the carriage and cage are moved far enough. The next step is to lock the cage 15 to the conductor 12. To accomplish the locking, the operator at the control panel 22 closes the switch 25 in a direction to energize the motor 28 and drive it in the right direction to cause the heads 53 and 57 to lower the clamps 74 onto the conductor 12 and clamp the cage 15 to the conductor 12. When the clamps are closed, a cycle switch 28s will be engaged and will open the clamp closing current of the motor 28 to cause the ammeter 25a to show no current flow so the operator is warned to open the switch 25.

Before releasing the carriage 16 from the cage 15, the operator first energizes the motor 26 to see if the cage 15 can be moved. Then he opens the switch 23 again and closes the switch 24 in a reverse direction to cause the motor 27 to raise the hook 50. When the hook 50 is opened, the cycle switch 27s opens the reverse circuit of the motor. The operator at the control panel 22 opens the switch 24 and closes the switch 23 in a reverse direction to cause the motor 26 to drive the sheaves 35 and 36 in the proper direction to return the carriage 16 to the tower 10. The trolleys 18 are removed as they reach the tower 10 and the cable 17 is wound up on the reel 20. The cage 15 is left, locked to the conductor 12, at the proper position.

Whenever it is necessary to return the cage 15 to the tower 10 for repair or cleaning, the carriage 16 is sent out on the conductor 12 until it engages the cage 15. Then the hook 50 is closed on the cage and the cage clamps are opened so that the cage can be brought back with the carriage 16 to the tower 10. The operations are essentially like those of installing the cage 15 in the first instance.

It is believed that the nature and advantages of the invention will be apparent from the foregoing description.

Having thus described our invention, we claim:

1. A warning light for indicating the position of a suspended power line conductor at a distance from its supports, comprising a supporting case, a transformer carried thereby, an electric lamp carried by the cage and connected to the transformer, said cage having spaced guides open at one side to receive a power line conductor, closures for the open sides of said guides cooperating with said guides to secure the cage on the conductor for endwise movement along the conductor, clamps on said cage adapted to engage the conductor and secure the cage against movement along the conductor, a self-propelled carriage having drive sheaves thereon mounting the carriage on the conductor, securing means on the carriage operable to secure the cage to the carriage, cooperating members on the cage and carriage, engaged when the cage is secured to the carriage, for closing and opening the clamps, power means on the carriage for operating the clamp opening and closing members, power means on the carriage for operating said securing means, and a remote control device for said power means.

2. A warning light adapted for mounting on a suspended power line conductor at a distance from the supporting towers for the power line comprising, in combination, a supporting cage having open guide means adapted to receive the conductor and suspend the cage on the conductor, a split field transformer on the cage through which the conductor extends when the cage is suspended on the conductor, an electric lamp carried by the cage and electrically connected to the transformer, clamp means on the cage operable to secure the cage against movement along the conductor, a self propelled carriage having a drive sheave thereon for moving the carriage on the conductor, securing means on the carriage operable to secure the cage to the carriage, means on the carriage for opening and closing the cage clamp means, and remote control means for said drive sheave, the securing means, and the clamp operating means.

3. A warning light adapted for mounting on a suspended power line at a distance from the supporting towers for the power line comprising, in combination, a supporting cage comprising two spaced apart end pieces, means rigidly securing the end pieces together, each end piece having a guide slot therein for loosely receiving the conductor to prevent motion of the cage therealong and having a clamp mounted thereon for clamping the conductor in the slot at any desired location on the conductor, a lamp mounting bar connecting the end pieces, two gaseous conduction tube lamps mounted on said bar, a transformer carried by one of said end pieces and having a split core for encircling the conductor, whereby the conductor serves as the primary winding of the transformer, said transformer having a secondary winding, the lamps being connected in parallel across said secondary winding.

4. A warning light for indicating the position of a suspended power line conductor at a distance from its supports comprising, in combination, a supporting cage having spaced guides open at one side to receive a power line conductor, closures for the open sides of said guides cooperating with said guides to loosely secure the cage on the conductor for endwise movement along the conductor, said guides including clamping portions operable to secure the cage against movement along the conductor at a desired point, a transformer on the cage having a split core receiving the conductor as a primary circuit, the transformer having a secondary winding, a pair of gaseous conduction lamps connected in parallel across the secondary winding, and a resistor and a condenser connected in series across the secondary winding.

5. A warning light adapted for mounting on a suspended power line at a distance from the supporting towers for the power line comprising, in combination, a supporting cage comprising two spaced apart end pieces, each end piece having a guide slot therein for loosely receiving the conductor for motion of the cage along the conductor, and having a clamp mounted thereon for clamping the conductor in the slot, a gaseous conduction tube lamp supported between the end pieces, a transformer carried by one of said end pieces and having a split core for loosely encircling the conductor, whereby the conductor serves as the primary winding of the transformer, said transformer having a secondary winding, the lamp being connected across said secondary winding, the other end piece having a gear journalled thereon, a shaft carried by and extending between the end pieces and connected to said gear, and means operatively connecting the shaft to said clamps for opening and closing them.

6. A warning light adapted for mounting on a suspended power line conductor from a point on a supporting tower at any desired distance from the tower comprising in combination, a supporting cage having open guide means adapted to receive the power line conductor and to loosely suspend the cage for movement along the conductor; a transformer supported by said cage and having a split core receiving said conductor as a primary winding for said transformer, and a secondary winding wound around a portion of said core; an electric lamp carried by said cage and electrically connected to said secondary winding; and remotely operable clamping means on said cage for securing said cage to said conductor at a desired remote point along said conductor.

References Cited in the file of this patent

UNITED STATES PATENTS

| | | |
|---|---|---|
| 874,411 | Le Blanc | Dec. 24, 1907 |
| 1,343,434 | Cook | June 15, 1920 |
| 1,505,325 | Elbert | Aug. 19, 1924 |
| 2,028,906 | Higgins | Jan. 28, 1936 |
| 2,272,080 | Bethenod | Feb. 3, 1942 |
| 2,501,558 | Williams | Mar. 21, 1950 |